(12) United States Patent
D'Amato et al.

(10) Patent No.: US 7,840,730 B2
(45) Date of Patent: Nov. 23, 2010

(54) CLUSTER SHARED VOLUMES

(75) Inventors: Andrea D'Amato, Kirkland, WA (US);
Rajeev Y. Nagar, Sammamish, WA (US); Gor Nishanov, Redmond, WA (US); Rajsekhar Das, Redmond, WA (US); Gregorio Maeso, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 12/147,956

(22) Filed: Jun. 27, 2008

(65) Prior Publication Data

US 2009/0327798 A1 Dec. 31, 2009

(51) Int. Cl.
*G06F 19/00* (2006.01)

(52) U.S. Cl. .......................... 710/74; 709/226

(58) Field of Classification Search ............... None
See application file for complete search history.

(56) References Cited

U.S. PATENT DOCUMENTS

| | | | |
|---|---|---|---|
| 5,828,876 A | 10/1998 | Fish et al. | |
| 6,353,898 B1 | 3/2002 | Wipfel et al. | |
| 6,865,597 B1 | 3/2005 | Bandopadhyay et al. | |
| 6,880,052 B2* | 4/2005 | Lubbers et al. | 711/162 |
| 6,954,881 B1* | 10/2005 | Flynn Jr. et al. | 714/43 |
| 6,996,672 B2* | 2/2006 | Lubbers et al. | 711/114 |
| 7,007,042 B2* | 2/2006 | Lubbers et al. | 1/1 |
| 7,039,827 B2* | 5/2006 | Meyer et al. | 714/4 |
| 7,076,509 B1* | 7/2006 | Chen et al. | 1/1 |
| 7,107,385 B2* | 9/2006 | Rajan et al. | 711/4 |
| 7,120,650 B2* | 10/2006 | Loy et al. | 1/1 |
| 7,139,772 B2 | 11/2006 | Bamford et al. | |
| 7,260,678 B1* | 8/2007 | Agarwal et al. | 711/112 |
| 7,272,674 B1* | 9/2007 | Nandi et al. | 710/38 |
| 7,277,952 B2* | 10/2007 | Nishanov et al. | 709/229 |
| 7,313,636 B2* | 12/2007 | Qi | 710/5 |
| 7,315,914 B1* | 1/2008 | Venkatanarayanan et al. | 710/316 |
| 7,346,801 B2* | 3/2008 | Brunelle et al. | 714/4 |
| 7,363,457 B1* | 4/2008 | Dekoning et al. | 711/170 |
| 7,383,404 B2* | 6/2008 | Barnes et al. | 711/158 |
| 7,478,220 B2* | 1/2009 | Forrer et al. | 711/173 |
| 7,590,737 B1* | 9/2009 | Chen et al. | 709/226 |
| 7,631,066 B1* | 12/2009 | Schatz et al. | 709/224 |
| 7,739,541 B1* | 6/2010 | Rao et al. | 714/4 |

(Continued)

OTHER PUBLICATIONS

"Using StarWind to Provide Cluster Shared Disk Resource", Nov. 28, 2006, Rocket Division Software, 2006, pp. 39.

(Continued)

*Primary Examiner*—Cheng-Yuan Tseng (57) ABSTRACT

Described is a technology by which a storage volume is shared by cluster nodes of a server cluster. In one implementation, each node includes a redirector that provides shared access to the volume from that node. The redirector routes file system metadata requests from applications and the like through a first (e.g., SMB) communications path to the owning node, and routes file system read and write data to the storage device through a second, high-speed communications path such as direct direct block level I/O. An owning node maintains ownership of the storage device through a persistent reservation mechanism that writes a key to a registration table associated with the storage device. Non-owning nodes write a shared key. The owning node validates the shared keys against cluster membership data, and preempts (e.g., removes) any key deemed not valid. Security mechanisms for controlling access are also described.

13 Claims, 10 Drawing Sheets

U.S. PATENT DOCUMENTS

| | | | |
|---|---|---|---|
| 7,739,677 B1* | 6/2010 | Kekre et al. | 717/168 |
| 2003/0105865 A1 | 6/2003 | McCanne et al. | |
| 2005/0192932 A1 | 9/2005 | Kazar et al. | |
| 2005/0251716 A1 | 11/2005 | Degrenand | |
| 2005/0283658 A1 | 12/2005 | Clark et al. | |
| 2006/0053216 A1 | 3/2006 | Deokar et al. | |
| 2007/0022314 A1* | 1/2007 | Erasani et al. | 714/4 |
| 2008/0005196 A1* | 1/2008 | Beck | 707/203 |

OTHER PUBLICATIONS

Policht, "SQL Server 2005 Part 3—High Availability and Scalability Enhancements—Failover Clustering", Dec. 10, 2004, Jupitermedia Corporation, pp. 7.

"Sun Microsystems Documentation: Failover and Scalable Services and Parallel Applications", retrieved at <<http://docs.sun.com/app/docs/doc/8196-0579/6n30dc0ms?a=view>>, on Feb. 16, 2008, pp. 5.

"Backing up and Recovering the Failover Cluster Configuration Database", Jan. 20, 2008, Microsoft Corporation, pp. 7.

Chudnow, "Shared SAN Cluster Configurations Get a Firm Foundation—VERITAS SAN Point Foundation Suite HA—Product Information", Mar. 2001, CNET Networks, Inc., pp. 6.

International Search Report and Written Opinion Received for PCT Application No. PCT/US2009/047267, mailed on Dec. 30, 2009, 11 pages.

* cited by examiner

CLUSTER SHARED VOLUMES

BACKGROUND

A server cluster is generally a group of servers (nodes) arranged such that if any server fails, the other servers of the cluster can transparently take over the work of the failed server, that is, restart its applications and thereby continue serving clients without significant interruption. This operation is generally referred to as failover, or failover clustering.

At present, failover clustering uses a "shared-nothing" storage model, in which each storage unit (e.g., a disk or part thereof) is owned by a single node. Only that node can perform input/output (I/O) to that specific storage unit, referred to by a LUN (Logical Unit Number). A LUN exposes one or more volumes.

In this model, the application and disk resources are part of a common group (a unit of failover corresponding to a LUN) with an explicit dependency between the application-resource and the disk-resource, in order to guarantee that disks are brought online before the applications start, and are put offline after the applications exit. As a result, clustered applications such as Microsoft® SQL Server, Microsoft® Exchange Server, and Microsoft® File Services are constrained to this I/O model, whereby any of the applications that need access to the same disk need to be run on the same cluster node.

However, an application's failover and restart operation is limited by the time taken for volume dismount and remount. Moreover the shared-nothing model may lead to a high management cost of the attached storage, because of the relatively large number of LUNs that are required in practical usage scenarios. For example, to have somewhat more granular failover when files stored are stored on a SAN (storage area network), numerous LUNs need to be carved out on the SAN, because of the need to failover all of the all the applications that depend on the same LUN at the same time; applications that reside on the same LUN cannot failover to different nodes, because only one node has access to the LUN at a given time.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a storage volume is shared by cluster nodes. In one implementation, each node includes a file I/O redirector that provides shared access to the volume from that node.

In one aspect, one node comprises an owning node that maintains ownership of the storage device through a persistent reservation mechanism that writes a key to a registration table associated with the storage device. Non-owning nodes write a shared key to the registration table. The owning node validates the shared keys against cluster membership data, and preempts (e.g., removes) any key deemed not valid.

In one aspect, the redirector routes file system metadata requests through a first communications path to the node that owns the storage device, and routes at least some file system read and write data to the storage device through a second communications path that comprises a high-speed communications path relative to the first communications path. For example, the lower speed path may be based upon a network protocol such as SMB, while the higher speed path may be direct block level I/O sent to the storage device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards cluster shared volumes, which in general allows clustered applications and services running in a cluster of server nodes to access their data from any node in the cluster. As will be understood, the usage of a cluster shared volume or volumes improves over a share-nothing model, including by not requiring that disk resources be placed in the same group-application, and eliminating the need of an explicit dependency.

As can be readily appreciated, cluster shared volume technology facilitates simplified SAN management (e.g., significantly fewer LUNs are needed), improves disk space utilization (e.g., one LUN may be shared by several applications), and provides support for buffered, un-buffered and memory-mapped files. At the same time, the technology provides a single name space for files, I/O fault-tolerance with regards to underlying volume failover or administrative moves, and I/O performance comparable to that of local file systems. Still further, the technology described herein provides a scalable fault-tolerant solution for clustered applications that require file system access from anywhere in the cluster. In general, as will be understood, a clustering service handles placement of the disks and mounting of the related volumes among the nodes in the cluster, handles metadata file operations and read/write I/O operations, including via a direct I/O mechanism as described below.

As will be understood, in one example implementation, cluster shared volume technology provides a scalable fault-tolerant distributed file system comprising a combination of "local" and "remote" NTFS file systems to clustered applications that require transparent file access from everywhere in the cluster. Cluster shared volume technology delegates to the clustering service the placement of the disks and the mounting of the related file system volumes among the nodes in the cluster, metadata file operations, including block allocations and file locking to file system, the SMB protocol and the Remote File Server Service, and Read/Write I/O operations via Direct I/O mechanism.

In one example implementation, cluster shared volume technology works with Microsoft® Windows® Server Failover Clustering using Microsoft® NTFS as a file system, and SAN technology, however, it is understood that these are only examples. Indeed, other environments, file systems and/or storage technologies may be used to implement one or more aspects of the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, clustering and data access in general.

Figure 1:
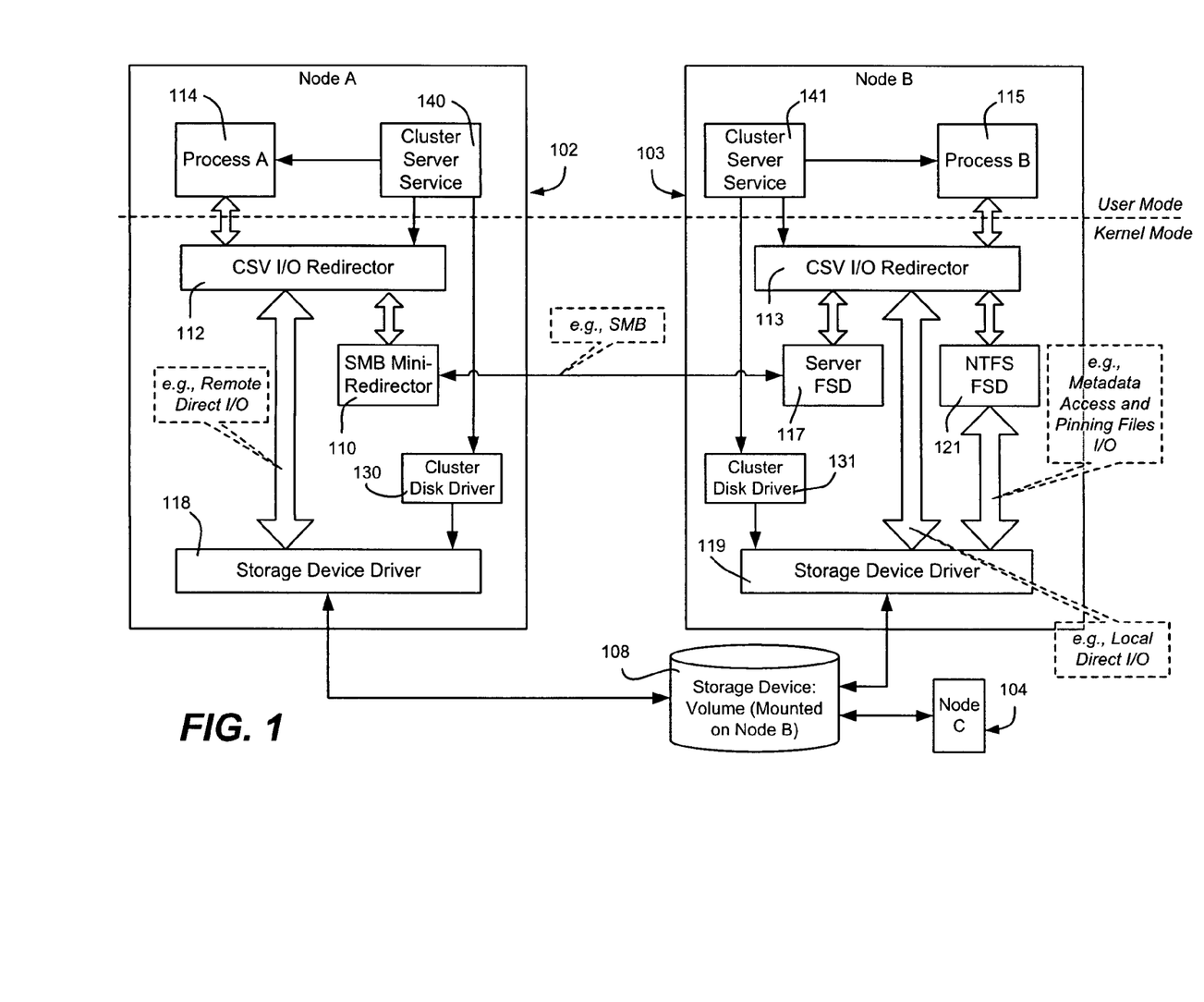
FIG. 1 is a block diagram representing example components in a server clustering environment with a clustered shared volume.

Turning to FIG. 1, there is shown a simplified block diagram of a cluster shared volume environment that allows clustered applications and services to access their data from any node in the cluster. In general, FIG. 1 shows a three node cluster, comprising node A 102, node B 103 and node C 104, with one NTFS volume/disk 108 (of a SAN disk) mounted on one of the nodes, namely the node B 103 in this example; (one or more other shared volumes, not shown in FIG. 1, may be mounted on the node B or other nodes). For purposes of clarity and brevity, internal components of the node C 104 are not shown or described herein, as they are similar to those of the node A 102.

In order to allow an application running on the node A 102 to access its file data on the cluster shared volume 108, the exemplified architecture exposes the volume 108 to the node A 102 in part via a mini-redirector 110, e.g., a mini-redirector based on the Server Message Block (SMB) protocol. The mini-redirector communicates with a server file system driver 117 on the node B 103, as described below. Further, a cluster shared volume redirector 112 intercepts and appropriately routes file system I/O from one or more applications and the like (e.g., services), as represented in FIG. 1 by the process A 114. A similar cluster shared volume redirector 113 and process B 115 are shown on the node B 103.

In one example implementation, any I/O request made by the process A 114 is intercepted by the cluster shared volume redirector 112. I/O requests for metadata are sent to the remote server file system driver (FSD) via the mini-redirector 110; however, unlike typical network shares, data (read and write) I/O requests may be sent by the cluster shared volume redirector 112 directly to the disk 108 through a local storage device driver 118, that is, without involving the node B 103 in this example. Note that cluster nodes are typically connected to a cluster's storage units via SCSI, Fibre Channel, ISCSI or other high-speed communication links, (as well as through the node on which the device is mounted, e.g., via an SMB link to a remote server (FSD) file system driver 117 in this example). In this NTFS-based example, the server file system driver 117 accesses the storage device volume 108 via node B's redirector 113 and an NTFS file system driver 121. In this way, the node A can access the storage device volume 108 via its local storage device driver 118 and a remote storage device driver 119.

As can be readily appreciated, this combination of SMB for metadata access and direct I/O for read and write data provides a significant performance improvement. Note however that the SMB link is still selectively available to the cluster shared volume redirector 112 for routing read and write I/O data, such as if the direct I/O data link fails, or to intentionally throttle node A's usage of the disk volume 108, e.g., to handle imbalances. Thus, the redirector may choose the communication path for the read and write I/O data based on at least one current condition.

The cluster shared volume technology exemplified herein relies on existing clustering service mechanisms for handling shared disks, with an altered reservation scheme that allows concurrent access to the volume from multiple cluster nodes. To this end, each node includes a cluster disk driver (e.g., cluster disk.sys) comprising a kernel driver. As described below, a cluster disk driver (e.g., 130) of a remote node with respect to the storage device volume 108 participates in a reservation mechanism/algorithm to access the device volume 108, while the owning node's cluster disk driver 131 participates in the reservation mechanism/algorithm to maintain and protect device ownership. The exemplified cluster disk drivers 130 and 131 work with a cluster service 140 and 141, respectively, to use an algorithm that leverages persistent reservation technology.

By way of background, a traditional persistent reservations ownership algorithm, described in U.S. Pat. No. 7,277,952 implements a share-nothing model, that is, the node owning the disk has exclusive ownership and full access, while other nodes have read-only access. The ownership is asserted by the owner node by placing a Write-Exclusive registrants only persistent reservation using a reservation key (called the PR key) into the PR reservation table on disk. The owning node maintains/defends this ownership by periodically (e.g., by default every three seconds) checking the PR registration table; other nodes challenge ownership (to take over if the owning node crashes) by registering their own keys in the PR registration table. If the owning node is operational and finds only its own PR key in the table, no action need be taken, however if it finds any key other than its own in the PR registration table, the owning node preempts that key (e.g., removes it from the table; if not operational the challenging node's key remains whereby it takes over ownership by preempting the current's owner's PR reservation with its own). Under a stable and functional cluster, the PR reservation table for a disk has one key, its PR registration table has M keys (all of them from the same owner node) where M is the number of IO paths to the disk for MPIO systems; for non-MPIO systems M is 1.

For the disks allocated in cluster shared volume, this persistent reservation algorithm is modified to allow the nodes in the cluster to access the disk in read-write mode, essentially simultaneously, in a safe manner. Machines outside of the cluster do not have access to cluster shared volume disks.

Figure 2:
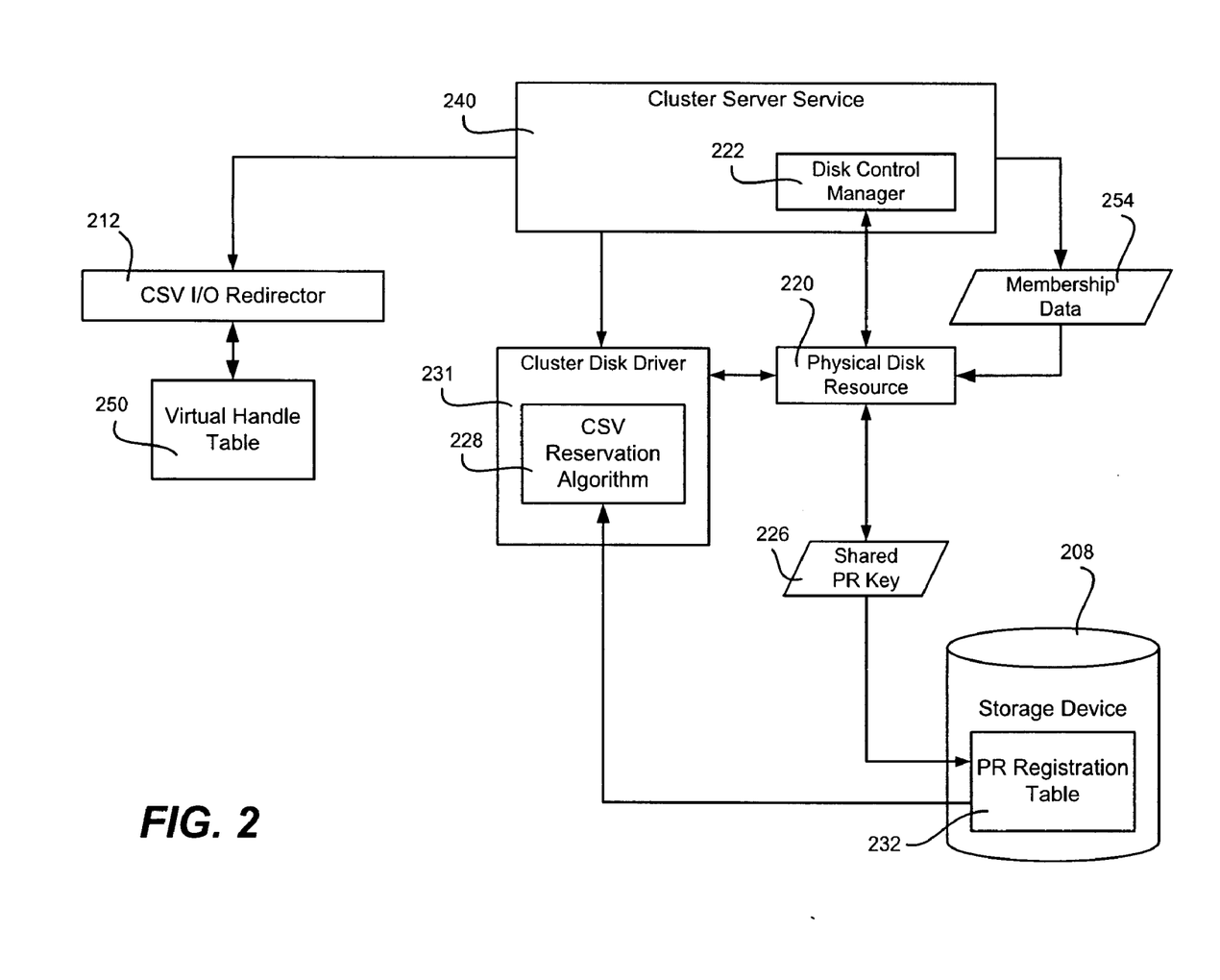
FIG. 2 is a block diagram showing example components within a node is a clustered shared volume clustering environment.

As generally represented in FIG. 2, a physical disk resource 220 manages shared disks in a cluster, and among other actions, ensures that clustered disks are accessed safely and protected from corruption, including facilitating essentially simultaneous access the same shared disks. This is accomplished by using shared persistent reservation (PR) keys, and the knowledge of cluster membership.

With respect to the cluster shared volume disk reservation algorithm, in one example implementation, a disk control manager 222 (e.g., of a cluster service 240) calls into the physical disk resource 220 to set up the new reservation policy for a clustered disk 208. More particularly, the clustered disk 208 needs to allow read-write I/O from other nodes, yet without violating the above-described concept of ownership. To this end, the owner node retains control of the disk, but relaxes the I/O policy on a per-node basis, via a shared PR key 226. Under this shared PR key mechanism/reservation algorithm 228, the cluster shared volume disk 208 in an N-node cluster has N*M keys in its registration table, where M is the number of I/O paths to the disk from a node in MPIO configuration; for non-MPIO systems, M is one. The owner node has M keys in the registration table 232 and one key in a reservation table.

Figure 3:
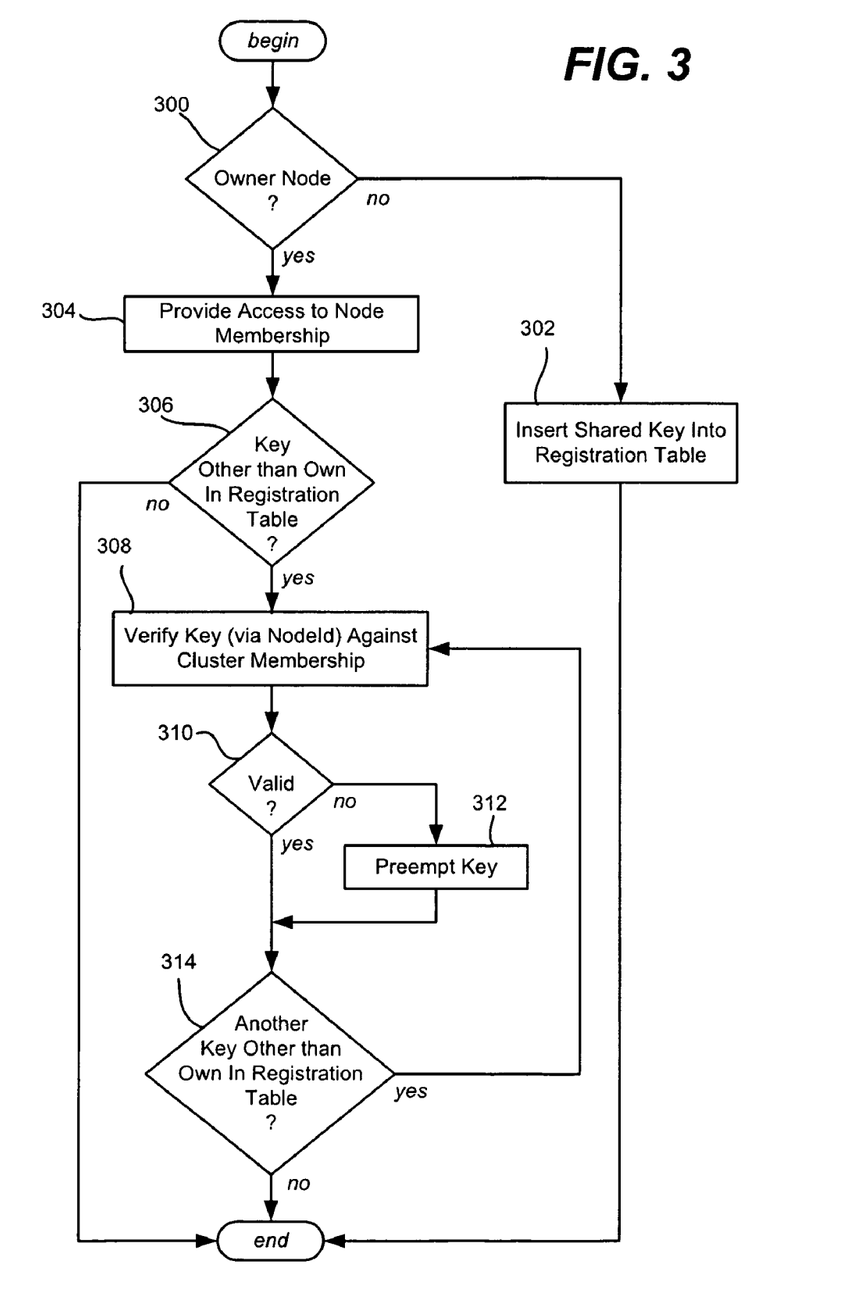
FIG. 3 is a flow diagram showing example steps taken to reserve and/or access a cluster shared volume.

FIG. 3 provides a flow diagram showing example steps of the algorithm as implemented via the exemplified components of FIG. 2, for example. For any non-owner nodes such as represented via step 300, the disk control manager 222 requests the physical disk resource 220 to insert a shared PR key 226 into the registration table 232 (step 302). This key is not shared among the nodes, but rather indicates that the node that it represents shares read-write access to the disk, along with the owner node and any other nodes. An identifier (e.g., NodeId) of the node is part of this shared PR key 226.

On the owner node, as differentiated via example step 300, step 304 informs the physical disk resource 220 of the cluster node membership data 254. This may be accomplished via a simple bitmask representing the active nodes in the cluster that share the volume, (e.g., typically all nodes, but not necessarily). The physical disk resource 220 passes this membership data 254 to the cluster disk driver 231.

As represented by step 306, when the cluster disk driver 231 on the owner node sees one or more extra keys (other than its own exclusive PR key) in the registration table 232, the cluster disk driver 231 verifies the NodeId of each of those keys against the cluster membership data 254, as represented by step 308. If the key is valid (step 310), the key is allowed to remain on the registration table 232, otherwise it is preempted (step 312). Step 314 repeats the validation for other keys; with an N-node cluster in which each node participates in shared volume access, there are N−1 such shared PR keys.

Turning to an aspect related to shared volume access points, so that each of the files has the same name and path when viewed from any node, the cluster shared volume environment provides a consistent file namespace. To this end, NTFS volumes managed by the cluster shared volume environment manifest themselves as directories and subdirectories under a cluster shared volume root directory. For example, in one form, cluster shared volumes may be exposed as follows:

<% systemdrive>:\clusterStorage\Vol1
<% systemdrive>:\clusterStorage\Vol2
<% systemdrive>:\clusterStorage\VolN Note that the architecture allows the possibility of exposing the cluster shared volume root on a non-system drive, or a RAMDISK-based drive created on cluster nodes, e.g., specifically for that purpose. As a result, a file may be identified using the same path and file name, regardless of the node from which it is being accessed ("location independence"). In one implementation, the cluster shared volume root directory may not be renamed, however the mapping volume-directories can be renamed by the administrator to better suit the applications' configurations.

In one implementation and in general, the cluster shared volume redirector installed on each node is responsible for providing seamless access to cluster shared volume disk or disks, regardless of where each disk is mounted. The cluster shared volume redirector is able to provide an uninterruptable response (apart from a short pause) when a disk is failing over from one system to another in case of a system or communications (e.g., host bus adapter) failure.

The cluster shared volume redirector 212 may collect per-disk access statistics to facilitate placement decisions by the disk control manager 222. This may be implemented as an NTFS filter driver. The cluster shared volume redirector 212 also may facilitate authorization of file access for remote shares, and monitor I/O to the cluster shared volume (disk) 208. The I/O is transparently redirected to the server on which the volume is mounted. Internally the cluster shared volume access points (e.g., C:\cluster shared volume\VolN) may be NTFS reparse points of type junction point or symbolic link. If the volume is locally mounted, the junction point will point to the local volume device object for example \??\Volume{ . . . }. If the volume is remotely mounted, the same symbolic link will point to \\<Remote Virtual Node's IP Address>\<ShareName>. The ShareName points to the share that cluster disk resource creates for each volume.

Figure 4:
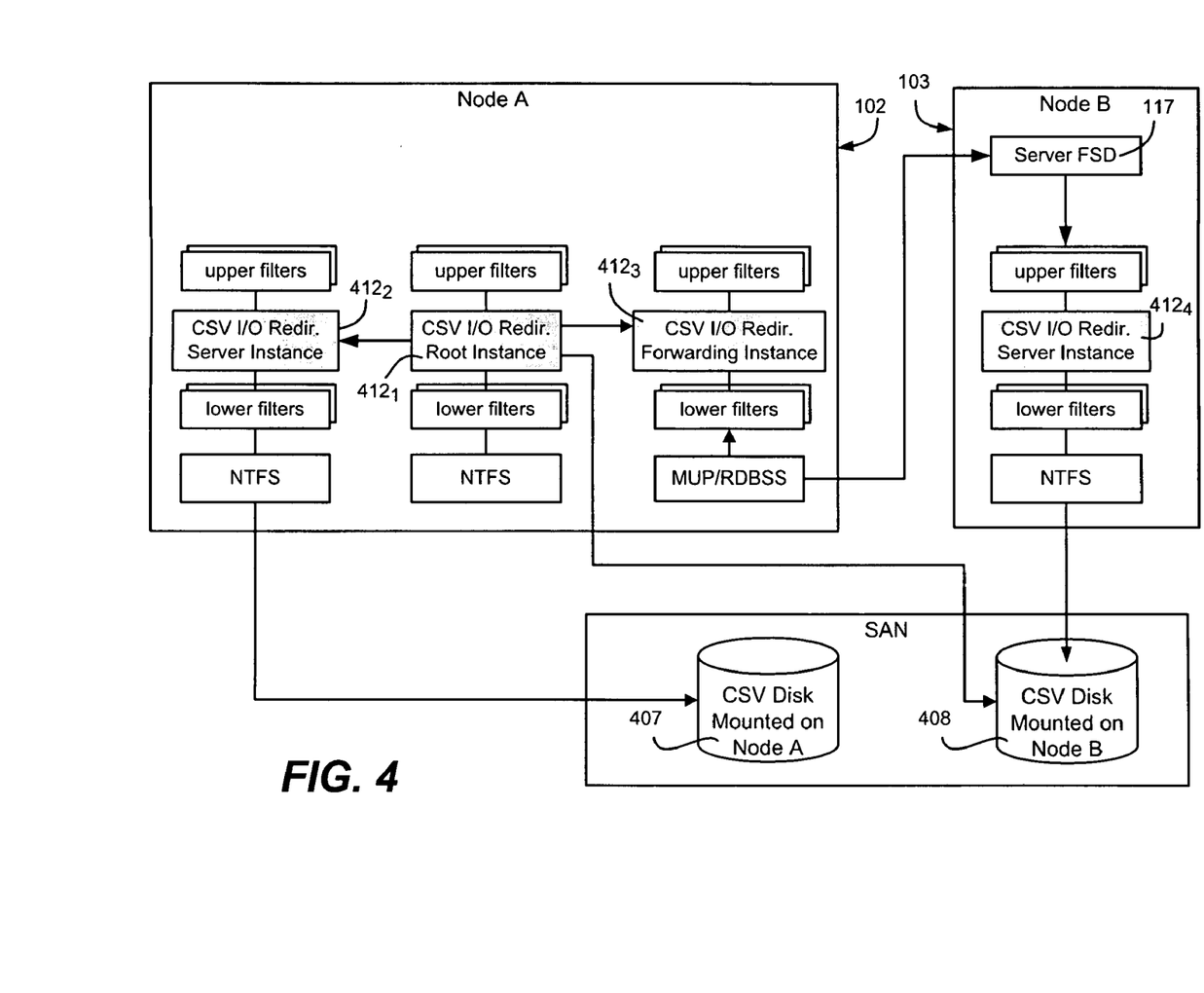
FIG. 4 is a block diagram showing example cluster shared volume redirector instances.

As represented in FIG. 4, the cluster shared volume redirector driver 212 also may manage several distinct instances (e.g., $412_1$-$412_3$ or $412_4$). A cluster shared volume redirector root instance $412_1$ attaches to a volume 408 hosting the cluster shared volume root. The root instance also couples to a forwarding instance e.g., $412_2$ for local access, or $412_3$ for remote access, e.g., via attachment to a Multiple UNC Provider (MUP)/Redirected Drive Buffering Subsystem (RDBSS). Note that in FIG. 4, the storage stack is omitted for clarity.

In general, the cluster shared volume redirector root instance $412_1$ is responsible for intercepting I/O, virtualization of file handles, capturing principal identity and forwarding I/O as appropriate. The cluster shared volume redirector forwarding instance $412_2$ or $412_3$ is used to inject I/O into appropriate volume stacks. The cluster shared volume redirector server instance $412_4$ is responsible for pinning the files and impersonating the client. Note that even though logically the forwarding instance and server instance are distinct entities, for efficiency they may be implemented by the same instance on a node.

A cluster shared volume environment allows applications to access various file system constructs, e.g., file, directories, links and so forth. The cluster shared volume mechanisms fast-path I/O operations for various types of files, e.g., buffered, un-buffered and memory mapped. The overall I/O performance of such remote files is similar to a local file system's I/O performance.

Figure 5:
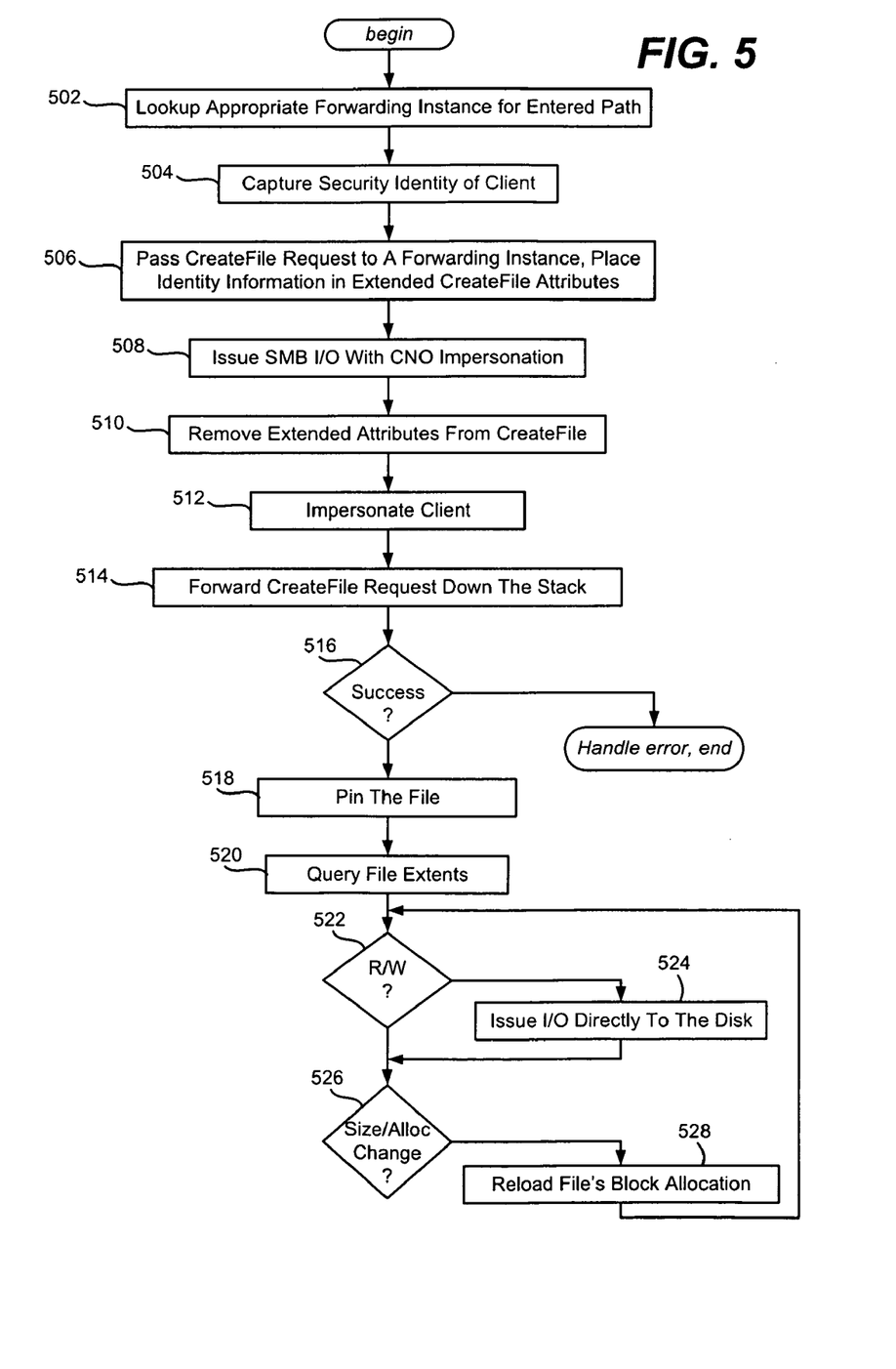
FIG. 5 is a block diagram showing example read and write operations via a cluster shared volume redirector.

FIG. 5 sets forth example steps performed by the cluster shared volume redirector driver when handling a CreateFile request for a remote file, beginning at step 502 which represents looking up the appropriate forwarding instance for the entered path. Step 504 represents capturing the security identity of the client.

Step 506 passes the CreateFile request to a forwarding instance, placing identity information in extended create file attributes. Step 508 issues the I/O over the SMB connection with cluster name object (CNO) impersonation. Note that the computer account that represents the name of the cluster is referenced by the CNO; this account is the primary security context for a cluster. Step 510 represents removing the extended attributes from CreateFile, with step 512 representing the step of impersonating the client.

Step 514 forwards the CreateFile request down the stack. If the operation was successful as evaluated at step 516, step 518 pins the file; (else handle the error otherwise, e.g., via a retry, returned error code, and so forth). Step 520 queries the file extents (e.g., identifying how the file is mapped), e.g., via the modified server file system driver (e.g., Server.sys).

At step 522, for read write requests (also described below with reference to FIGS. 6 and 7), I/O may be issued directly to the disk (step 524). For example, whenever a read/write operation occurs for the file, the cluster shared volume filter driver uses the file's logical block allocation, volume's block offset on the LUN, and the LUN's device number, converts the I/O operation to a raw disk sector read/write operation, and sends it down the local NT device stack.

As represented by step 526, whenever the user issues an I/O to the file that changes the file's size and/or logical block allocation, the cluster shared volume filter driver reloads the file's block allocation (step 528).

Figure 6:
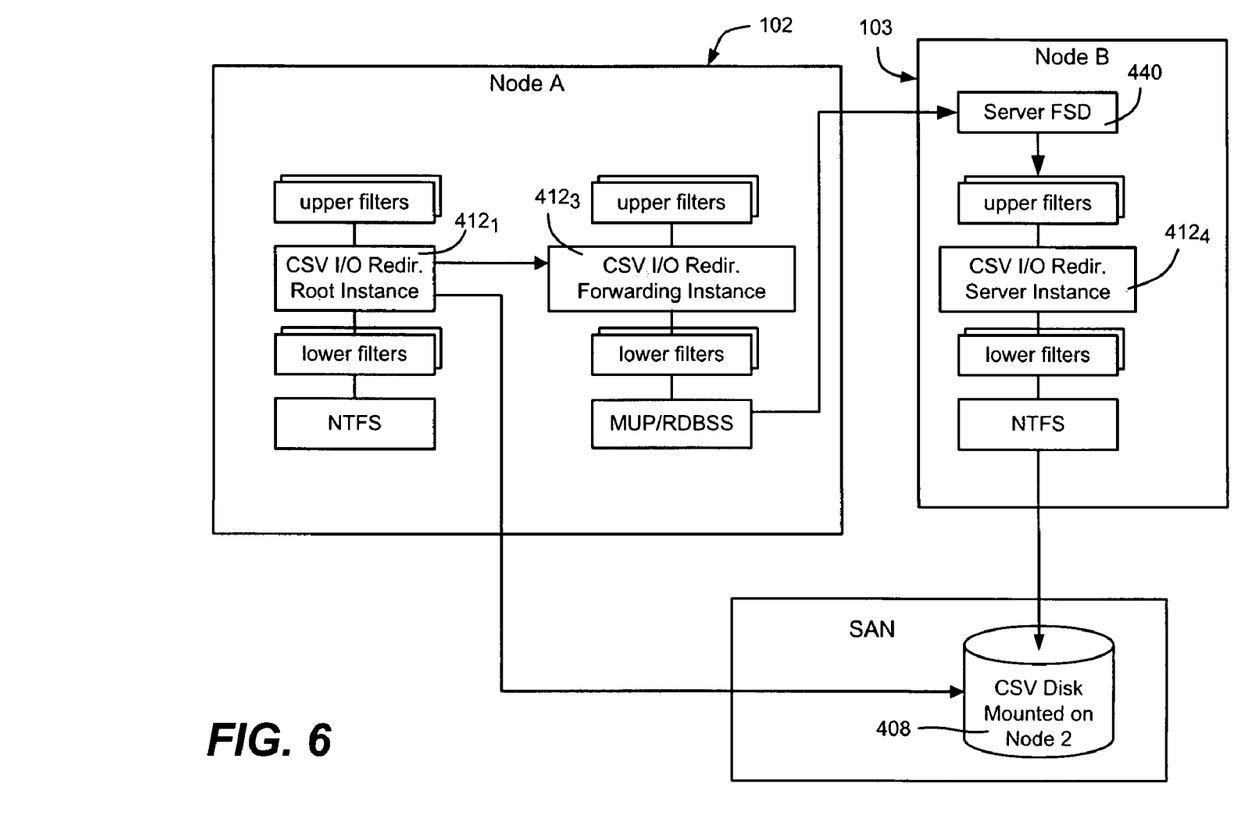
FIG. 6 is a flow diagram showing example steps performed by a cluster shared volume redirector (for example) when handling a file creation request for a remote file on a cluster shared volume.
Figure 7:
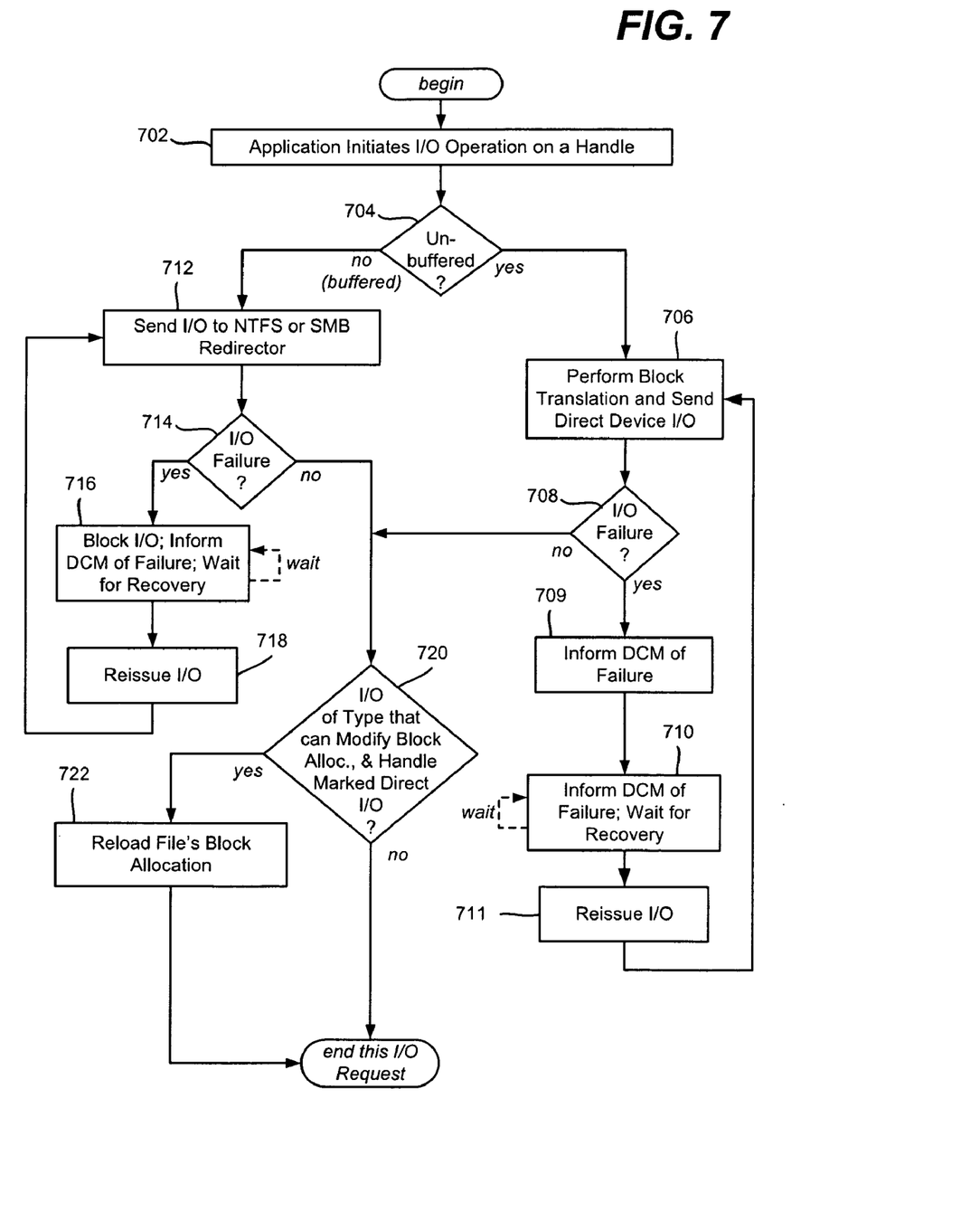
FIG. 7 is a flow diagram showing example steps performed by a cluster shared volume redirector (for example) with respect to forwarding read/write I/O to a cluster shared volume.

FIGS. 6 and 7 exemplify cluster shared volume redirector read/write I/O operation; note that in FIG. 6, the storage stack is omitted for clarity. More particularly, the cluster shared volume environment also provides fault tolerance and transparently handles node, network, and communications (e.g., host bus adapter) failures. This may be achieved in cluster shared volume redirector by a virtual handle table 250 (FIG. 2) and the use of the cluster NetFT fault tolerant TCP/IP driver.

NetFT is a cluster network fault-tolerant TCP/IP NDIS miniport driver that exposes a virtual adapter for the virtual subnet at each host. The physical network adapters are also exposed to the IP layer at each host. The NetFT driver transfers packets on the virtual subnet by tunneling them through what is deemed to be the best available physical network path. In order to obtain fault-tolerant communication, the cluster shared volume redirector binds to an interface on the virtual subnet; if the volume is remotely mounted the same symbolic link will point to \\<Remote Virtual Node's IP Address>\<ShareName>, where the "Remote Virtual Node IP address" is the intra-cluster virtual IP address.

Applications need not be concerned with the physical location of a cluster shared volume, because the disk volume may be moved as nodes fail, or for other reasons such as load balancing, administration, servicing, management and so forth. To mask movement of a disk to another node from the perspective of an application, for each handle opened by an application on a file that resides on a cluster shared volume, the cluster shared volume redirector 212 internally maintains a handle to the file, e.g., in a virtual handle table 250 (FIG. 2). Upon a communications (e.g., host bus adapter) failure or node failure, the cluster shared volume redirector 212 closes and re-opens the internal (actual) handle, while the application (virtual) handle remains valid. In the event of the host bus adapter failure, a different communication path is used, (e.g., SMB instead of the direct I/O). In the event of the node failure, the handle is reopened pointing to a new owner node; (note that the cluster infrastructure is responsible for detection of a node failure and subsequent disk failover). If the disk moves, the cluster shared volume redirector 212 updates its virtual handle table 250, transparent to the application.

In the normal case, for each operation initiated by the application, the cluster shared volume filter driver 212 redirects the operation based on the internal (actual) handle, such as set forth in the example steps for I/O forwarding of FIGS. 6 and 7. More particularly, as represented by step 702, when the application initiates an I/O operation on a virtual handle and unbuffered I/O is in use for the file (step 704), the block translation is performed and the I/O sent directly to the device at step 706. In the event that the direct I/O fails (step 708), step 709 indicates failure to the disk control manager 222. Step 710 represents waiting for the disk control manager to complete its recovery operations, after which step 711 reissues the I/O Typical types of such failures include a communications (e.g., host bus adapter) failure or owner node failure.

If instead buffered I/O is in use, then step 704 branches to step 712 where the I/O is sent to the NTFS or SMB redirector, depending on where the disk is coupled, that is, local or remote. Note that step 704 also may represent condition-based routing, e.g., if the direct I/O communications path is down, or intentional throttling is desired, the network protocol-based (e.g., SMB) communications path is used. In the event of failure of redirected I/O (step 714), step 716 represents blocking the I/O, informing the disk control manager of the failure, and waiting for the disk control manager to complete its recovery operations; thereafter step 718 reissues the I/O.

The I/O may be redirected I/O of the type that can modify block allocation of the file (for example resize), while the handle is marked for direct I/O. If so, as evaluated by step 720, step 722 reloads the file's block allocation.

Figure 8:
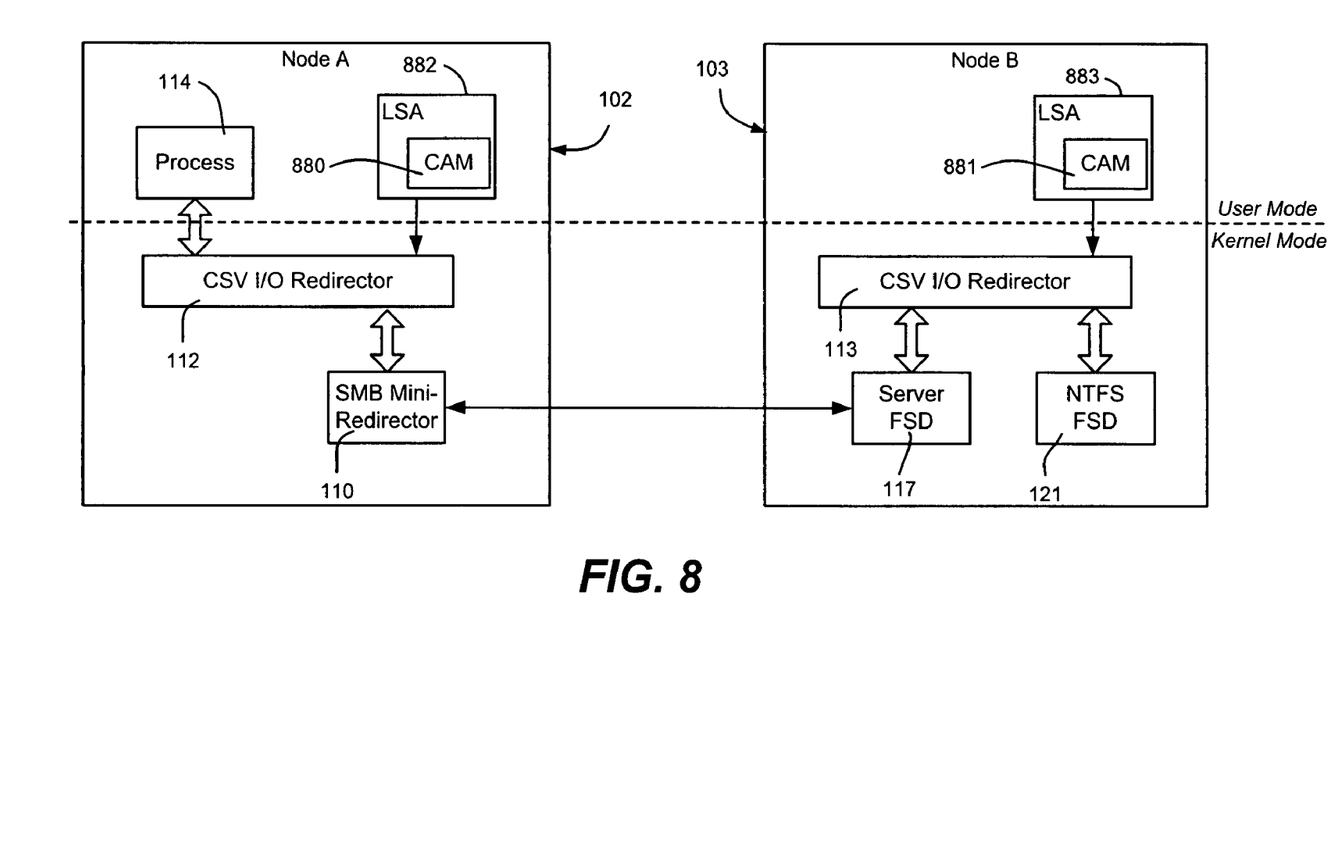
FIG. 8 is a block diagram showing a cluster authentication manager module running to provide security support on a node.
Figure 9:
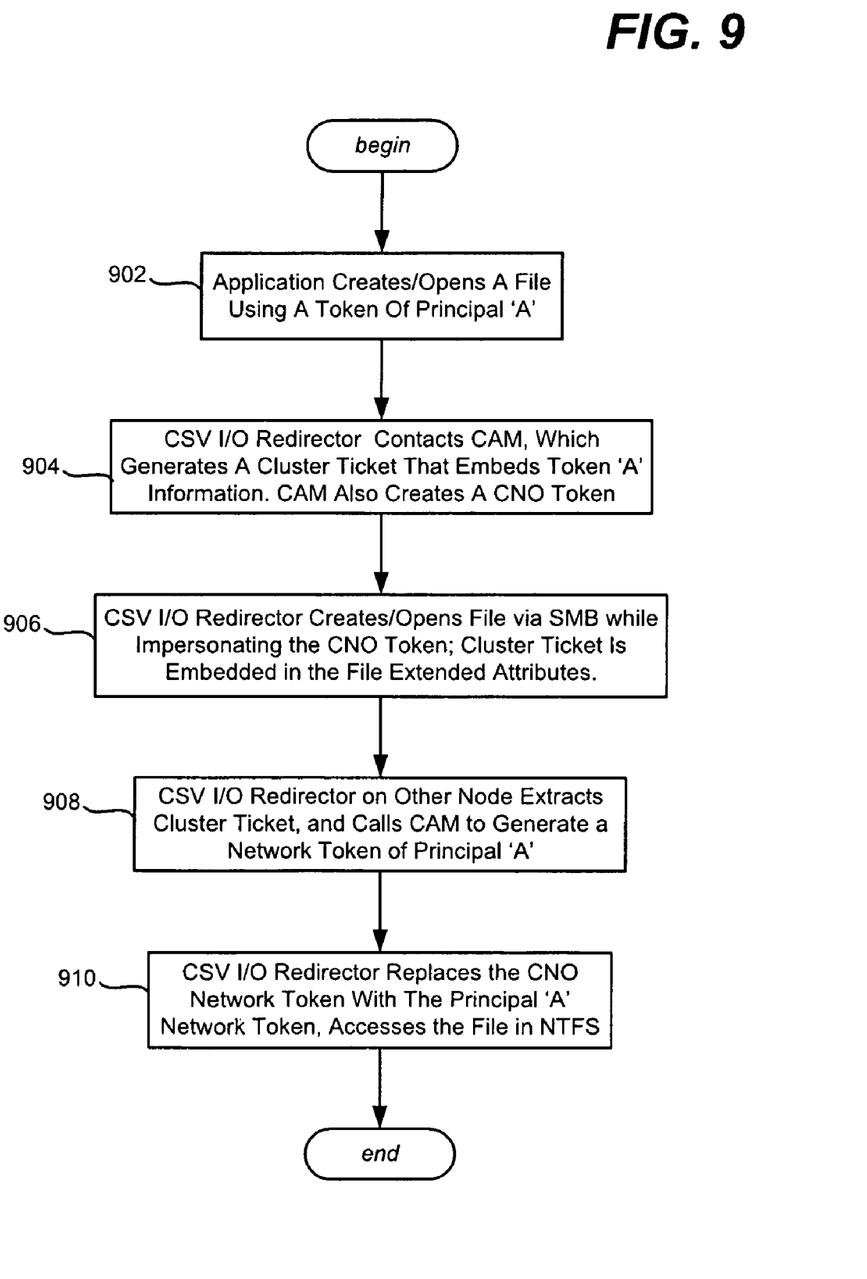
FIG. 9 is a flow diagram showing example steps related to security with respect to a cluster shared volume.

Turning to aspects related to security as generally represented in the examples of FIGS. 8 and 9, any authorized client may access the volumes that are exposed in the cluster shared volume environment. Clients (processes and services) running under user domain accounts and selected local built-in accounts, such as LocalSystem and LocalServer are supported. When traversing inter-node network communication, a cluster identity (CNO) is used in place of the local user identity, and subsequently the original user identity is restored in the remote node. As a result the client application is unaware of the network boundary, accessing the resource as it was local. This model also presents a proper network access check: only requests proceeding from another cluster node have access.

In one example implementation, a cluster authentication manager, or CAM (880 or 881 in FIG. 8), comprises a module that runs inside respective a Local Security Authority (LSA) service (882 or 883 in FIG. 8), as a Security Support Provider/Authentication Package (SSP/AP) on each node. A CAM 880, for example, may provide replicated Windows® logon sessions and user security access tokens to a cluster shared volume.

The CAM 880 retrieves groups and privilege data from the original security access token, and reconstructs a network token in the destination machine using that information. This is done without requiring delegation, credentials, or access to a domain controller, thereby improving performance and allowing operations in the environments where security delegation is prohibited by the domain policy.

In one example implementation, the groups and privileges information is stored in a blob referred to as the "Cluster Ticket". Cluster Tickets are similar to Kerberos tickets, except that Cluster Tickets may be used for replicating any token in the original node, including NTLM tokens and local system tokens (e.g. LocalService or NetworkService).

Cluster tickets are encrypted and secured by a key shared by all cluster nodes. In one example implementation this key is a session key created and transmitted in a secure way during the cluster form/join process.

In operation, as generally represented by the example steps of FIG. 9, at step 902 the application creates/opens a file using a token of principal 'A'. At step 904, the cluster shared volume redirector 112 contacts the CAM 880, which generates a Cluster Ticket that embeds the Token 'A' information. The CAM 880 also creates a CNO token.

At step 906, the cluster shared volume redirector creates/opens the file in SMB, while impersonating the CNO Token;

(note that in one implementation, the CNO is the only principal that has full access to the 'NTFS root' share). The Cluster Ticket is embedded in the File Extended Attributes (step 906).

At step 908, the cluster shared volume redirector 113 (on the other node) extracts the Cluster Ticket, and calls its CAM 881 to generate a Network Token of principal 'A'. The cluster shared volume redirector 113 replaces the CNO Network token with the Principal 'A' Network Token, thereby accessing the file via NTFS. As part of the security check, the shared persistent reservation key may be evaluated to ensure that a requesting node is still a valid member.

Exemplary Operating Environment

Figure 10:
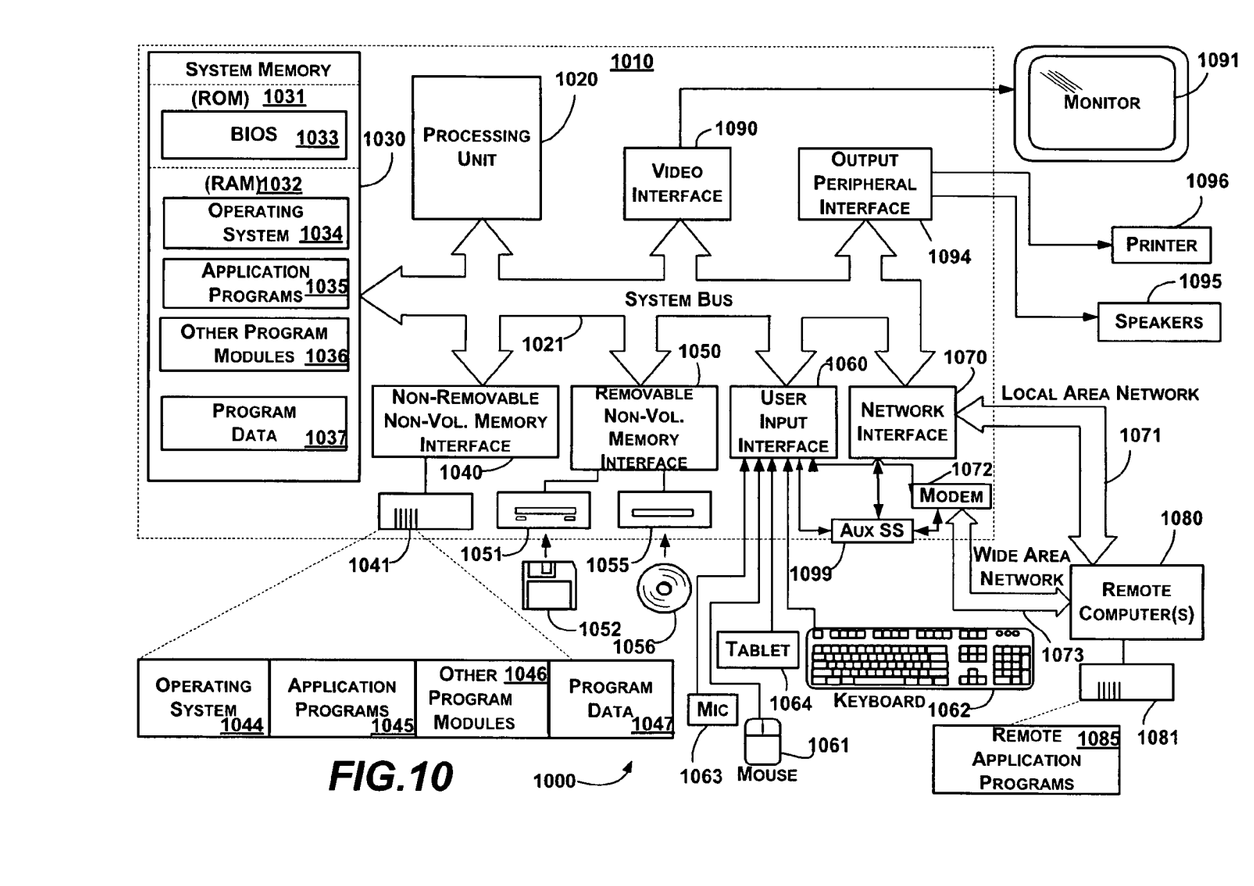
FIG. 10 shows an illustrative example of a computing environment into which various aspects of the present invention may be incorporated.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component 1074 such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a server cluster environment, a system comprising, a plurality of nodes, and a storage device coupled to the plurality of nodes, the storage device including a volume mounted on one of the nodes, the node on which the volume is mounted comprising an owning node of the storage device, and each other node comprising a non-owning node and including a redirector that provides shared access to the volume from that non-owning node, wherein the redirector routes file system metadata requests through a first communications path to the owning node, and routes at least some file system read and write data to the volume through a second communications path that comprises a high-speed communications path relative to the first communications path, wherein the redirector comprises a root instance that intercepts I/O requests, and a forwarding instance coupled to the root instance that forwards I/O data into a driver, wherein the redirector maintains a handle table for converting an application's virtual handle to an actual file system handle used by the volume, and changes the actual file system handle if the volume moves to a storage device of another node without changing the virtual handle, wherein the owning node includes a mechanism for maintaining ownership of the storage device comprising a persistent reservation mechanism that writes a key indicative of ownership to a registration table associated with the storage device, and each non-owning node writes a shared key to the registration table.

2. The system of claim 1 wherein the owning node validates shared keys against cluster membership data, and preempts any key deemed not valid based upon the cluster membership data.

3. The system of claim 1 wherein the redirector selectively determines whether to route file system read and write data through the first or second communications path based on at least one current condition.

4. The system of claim 1 further comprising a security component that uses a token to contain information corresponding to group or privilege data, or both group and privilege data, used to access a file.

5. The system of claim 1 wherein the volume is accessed via a filename corresponding to a single namespace independent of which node provides the filename.

6. In a computing environment, a method comprising,
receiving an I/O request at a non-owning node of a cluster directed towards a volume that is mounted on an owning node of the cluster;
processing the I/O request by a redirector of the non-owning node, including determining whether the I/O request may be handled by direct I/O to the volume, and if so, by redirecting the I/O request via direct I/O to the volume, and if not, by redirecting the I/O request over a network protocol to the second node for handling the I/O request, wherein the redirector routes file system metadata requests through a first communications path to the owning node, and routes at least some file system read and write data to the volume through a second communications path that comprises a high-speed communications path relative to the first communications path, wherein the redirector comprises a root instance that intercepts I/O requests, and a forwarding instance coupled to the root instance that forwards I/O data into a driver; and maintaining a handle table for converting an application's virtual handle to an actual file handle, detecting failure of a node hosting a storage device corresponding to the volume or a host bus adapter on the node owning the storage device corresponding to the volume, and changing the actual file system handle without changing the virtual handle if the volume moves to a storage device of another node.

7. The method of claim 6 further comprising, maintaining ownership of the storage device at the owning node via a persistent reservation mechanism.

8. The method of claim 6 wherein determining whether the I/O request may be handled by direct I/O comprises determining whether the I/O request corresponds to metadata or read/write data, or determining whether the I/O request corresponds to buffered or unbuffered I/O, or both determining whether the I/O request corresponds to metadata or read/write data, and determining whether the I/O request corresponds to buffered or unbuffered I/O.

9. The method of claim 6 wherein processing the I/O request comprises detecting a host bus adapter failure to determine that I/O request may not be handled by direct I/O, pausing the I/O request, switching to an alternative path, and resuming the I/O request.

10. The method of claim 6 wherein determining whether the I/O request may be handled by direct I/O comprises determining a condition of a direct I/O communications path, or determining whether to communicate I/O data over the network protocol based on a throttling condition.

11. The method of claim 6 wherein the request is handled by direct I/O, and further comprising, determining whether the I/O request is of a type that may modify block allocation of a file corresponding to the I/O request, and if so, obtaining a block allocation of the file.

12. The method of claim 6 wherein the I/O request corresponds to metadata used for creating or opening a file, and further comprising, processing security information to grant access to the file.

13. One or more computer-readable storage media having computer-executable instructions, which when executed perform steps, comprising, receiving an I/O request at a non-owning node of a cluster directed towards a volume that is mounted on an owning node of the cluster;

processing the I/O request by a redirector of the non-owning node, including determining whether the I/O request may be handled by direct I/O to the volume, and if so, by redirecting the I/O request via direct I/O to the volume, and if not, by redirecting the I/O request over a network protocol to the second node for handling the I/O request, wherein the redirector routes file system metadata requests through a first communications path to the owning node, and routes at least some file system read and write data to the volume through a second communications path that comprises a high-speed communications path relative to the first communications path, wherein the redirector comprises a root instance that intercepts I/O requests, and a forwarding instance coupled to the root instance that forwards I/O data into a driver; and maintaining a handle table for converting an application's virtual handle to an actual file handle, detecting failure of a node hosting a storage device corresponding to the volume or a host bus adapter on the node owning the storage device corresponding to the volume, and changing the actual file system handle without changing the virtual handle if the volume moves to a storage device of another node.

* * * * *